US009189107B2

(12) United States Patent
Wilson et al.

(10) Patent No.: US 9,189,107 B2
(45) Date of Patent: *Nov. 17, 2015

(54) ERASER FOR USE WITH OPTICAL INTERACTIVE SURFACE

(71) Applicant: Steelcase Inc., Grand Rapids, MI (US)

(72) Inventors: Scott E. Wilson, Kailua-Kona, HI (US); James D. Watson, Duluth, GA (US); Peter W. Hildebrandt, Duluth, GA (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,169

(22) Filed: Oct. 24, 2014

(65) Prior Publication Data
US 2015/0042622 A1 Feb. 12, 2015

Related U.S. Application Data

(63) Continuation of application No. 12/174,398, filed on Jul. 16, 2008, now Pat. No. 8,890,842.

(60) Provisional application No. 61/061,381, filed on Jun. 13, 2008.

(51) Int. Cl.
G06F 3/03 (2006.01)
G06F 3/042 (2006.01)

(52) U.S. Cl.
CPC ............ *G06F 3/0428* (2013.01); *G06F 3/0304* (2013.01)

(58) Field of Classification Search
CPC ......... G06F 3/005; G06F 3/03; G06F 3/0304; G06F 3/0308; G06F 3/0325; G06F 3/03545; G06F 3/0412; G06F 3/042; G06F 3/0421; G06F 3/0425; G06F 3/0428; B43L 19/00; B43L 19/0043

See application file for complete search history.

(56) References Cited

U.S. PATENT DOCUMENTS

| 450,378 A | 4/1891 | Robinson |
| 729,489 A | 5/1903 | Cigol |
| 4,670,751 A | 6/1987 | Enokido et al. |
| 4,711,977 A | 12/1987 | Miyamori et al. |
| 5,023,408 A | 6/1991 | Murakami et al. |
| 5,134,388 A | 7/1992 | Murakami et al. |
| 5,248,856 A | 9/1993 | Mallicoat |

(Continued)

FOREIGN PATENT DOCUMENTS

| EP | 1420335 | 5/2004 |
| EP | 1420335 A2 | 5/2004 |

(Continued)

OTHER PUBLICATIONS

Examination Report dated May 10, 2011 for related European Patent Application No. 09761058.8.

(Continued)

*Primary Examiner* — Temesgh Ghebretinsae
*Assistant Examiner* — Keith Crawley
(74) *Attorney, Agent, or Firm* — Troutman Sanders LLP; Ryan A. Schneider; Christoher W. Glass

(57) ABSTRACT

An eraser is usable in a display system having a display surface. The eraser includes one or more optical detection elements for determining the coordinates of the eraser relative to the display surface.

20 Claims, 16 Drawing Sheets

(56) References Cited

U.S. PATENT DOCUMENTS

| | | | |
|---|---|---|---|
| 5,434,370 | A | 7/1995 | Wilson et al. |
| 5,623,129 | A | 4/1997 | Mallicoat |
| 5,757,812 | A | 5/1998 | Kim |
| 5,818,424 | A | 10/1998 | Korth |
| 6,000,946 | A | 12/1999 | Snyders et al. |
| 6,153,836 | A | 11/2000 | Goszyk |
| 6,239,792 | B1 | 5/2001 | Yanagisawa et al. |
| 6,285,959 | B1 | 9/2001 | Greer |
| 6,300,580 | B1 | 10/2001 | Shenholz et al. |
| 6,310,615 | B1 | 10/2001 | Davis et al. |
| 6,326,954 | B1 | 12/2001 | Van Ieperen |
| 6,498,602 | B1 | 12/2002 | Ogawa |
| 6,545,671 | B1 | 4/2003 | Silverman |
| 6,567,078 | B2 | 5/2003 | Ogawa |
| 6,587,099 | B2 | 7/2003 | Takekawa |
| 6,667,739 | B2 | 12/2003 | Atwood et al. |
| 6,724,371 | B1 | 4/2004 | Shenholtz et al. |
| 6,940,486 | B2 | 9/2005 | Cohen et al. |
| 7,034,809 | B2 | 4/2006 | Hasegawa |
| 7,310,090 | B2 | 12/2007 | Ho et al. |
| 2001/0030643 | A1 | 10/2001 | Holtzman |
| 2003/0006973 | A1 | 1/2003 | Omura et al. |
| 2005/0088426 | A1 | 4/2005 | Smirnov et al. |
| 2005/0178953 | A1 | 8/2005 | Worthington et al. |
| 2005/0245302 | A1 | 11/2005 | Bathiche et al. |
| 2006/0003307 | A1 | 1/2006 | Hester et al. |
| 2006/0092178 | A1 | 5/2006 | Tanguay, Jr. et al. |
| 2006/0174139 | A1 | 8/2006 | Keely et al. |
| 2006/0192090 | A1 | 8/2006 | Lau |
| 2006/0232568 | A1 | 10/2006 | Tanaka et al. |
| 2006/0238499 | A1 | 10/2006 | Wenstrand |
| 2008/0122786 | A1 | 5/2008 | Pryor et al. |
| 2009/0122008 | A1 | 5/2009 | Melkis et al. |
| 2010/0066016 | A1 * | 3/2010 | Van De Wijdeven et al. ... 273/237 |
| 2011/0083109 | A1 | 4/2011 | Hildebrandt et al. |

FOREIGN PATENT DOCUMENTS

| | | |
|---|---|---|
| JP | 2003312192 | 11/2003 |
| WO | WO 9007150 | 6/1990 |
| WO | WO 0163549 | 8/2001 |
| WO | WO 2007006772 | 1/2007 |
| WO | 2008/032270 | 3/2008 |
| WO | 2008032270 A2 | 3/2008 |

OTHER PUBLICATIONS

International Search Report and Written Opinion dated Sep. 14, 2010 for related PCT Application No. PCT/US2009/047053.

Mallicoat, S.W., "An Electronic Whiteboard Using Barcodes", Microfield Graphics, Inc., Conference: 1994 SID International Symposium Digest of Technical Papers, SID '94 Digest, pp. 535-537, Jun. 1994.

Office Action in related Canadian Patent Application No. CA2727280, mailed Sep. 3, 2015.

* cited by examiner

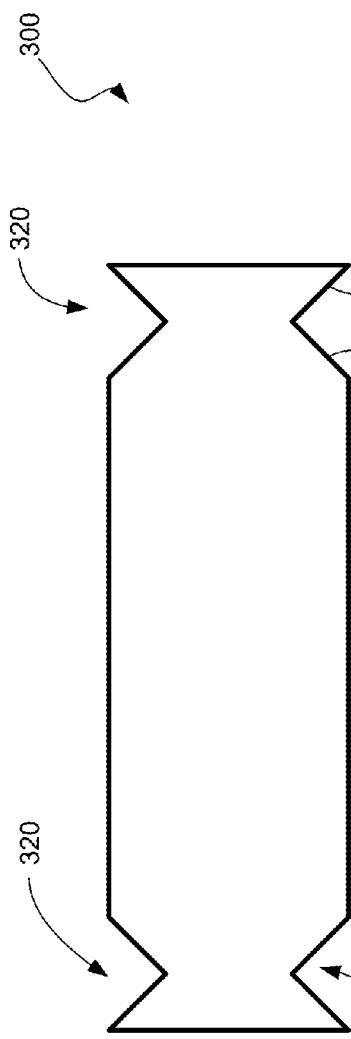
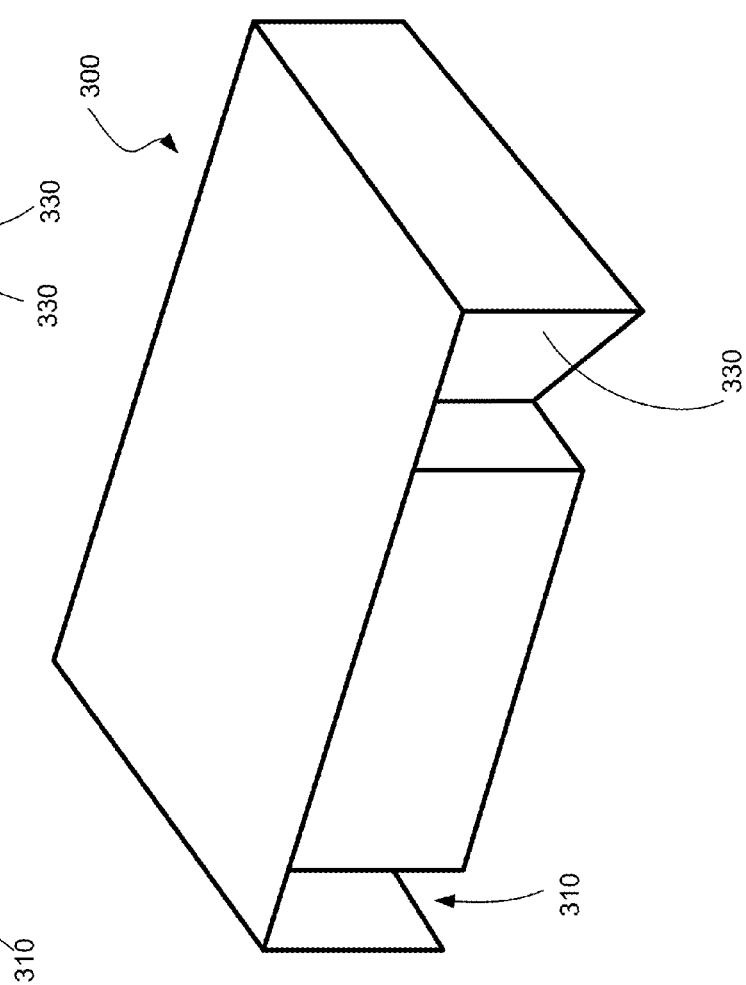
Fig. 4A
Fig. 4B

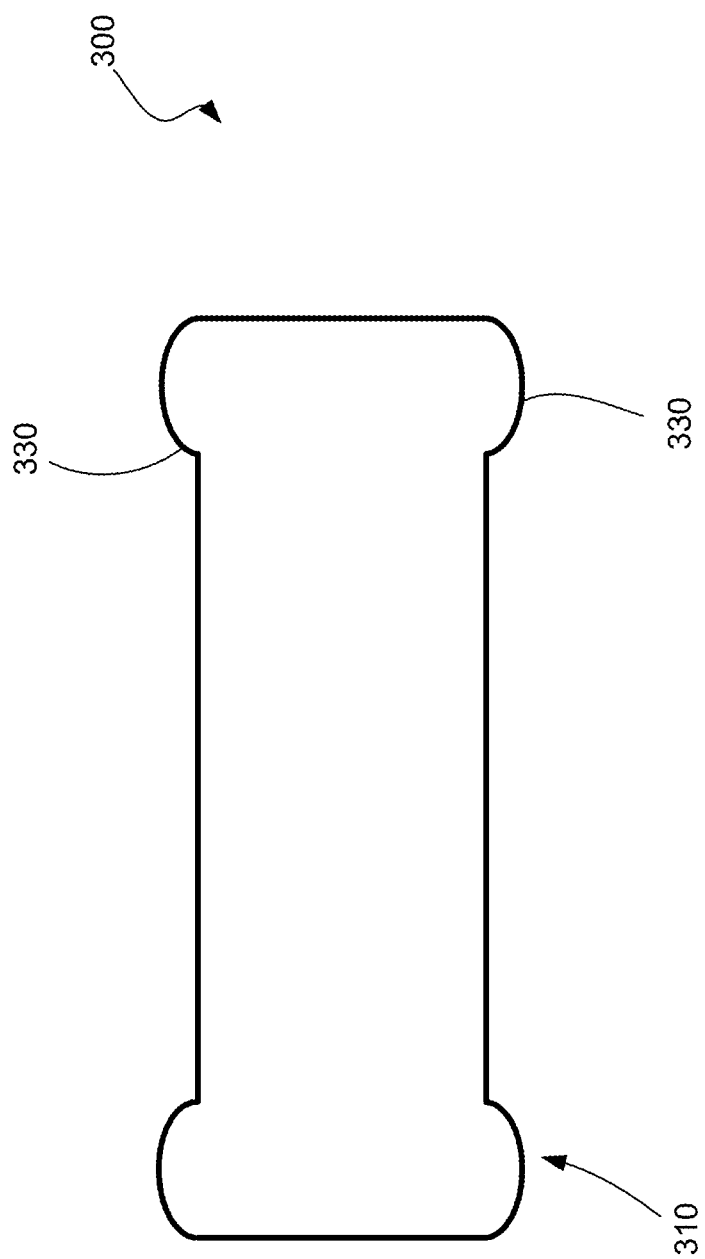

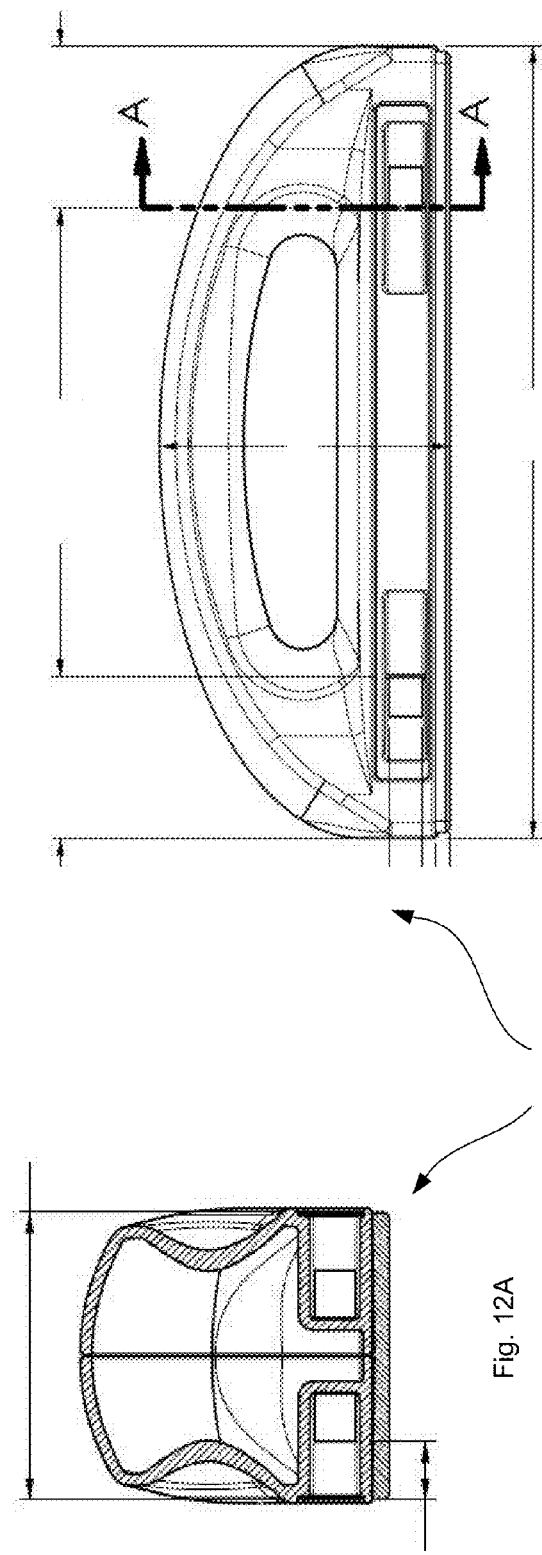
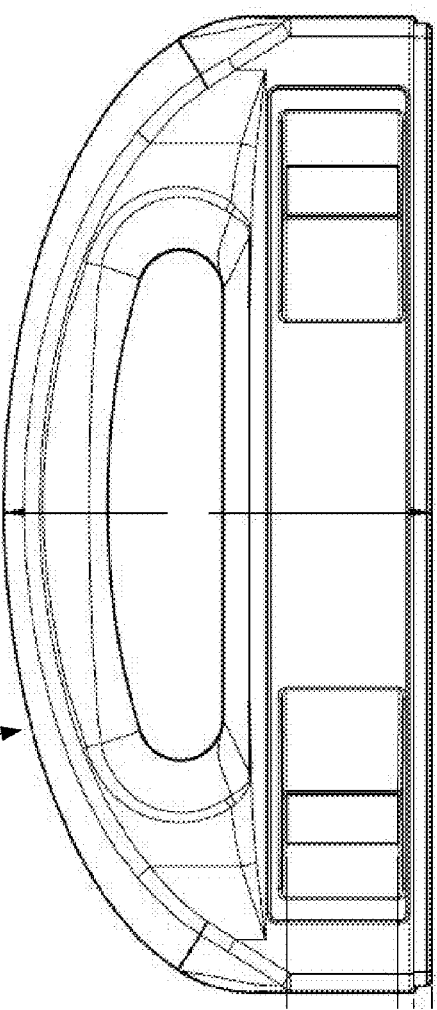
Fig. 12A
Fig. 12B
Fig. 12C

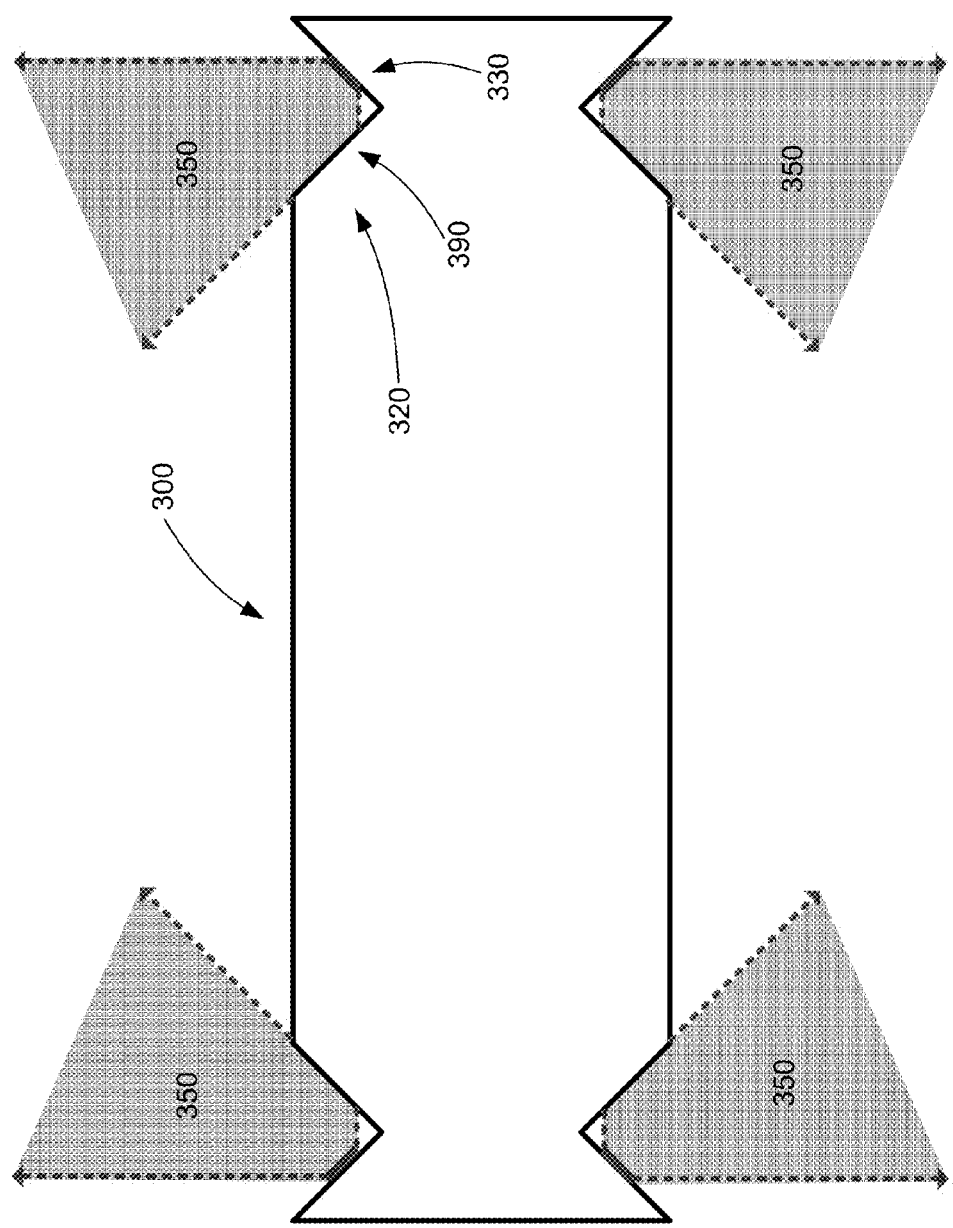

ERASER FOR USE WITH OPTICAL INTERACTIVE SURFACE

CROSS-REFERENCE TO RELATED APPLICATIONS

This Application is a continuation application claiming priority under 35 U.S.C. §120 to U.S. Non-provisional patent application Ser. No. 12/174,398, filed 16 Jul. 2008, which claims priority under 35 U.S.C. §119 to U.S. Provisional Patent Application No. 61/061,381 filed 13 Jun. 2008. The entire contents and substance of both of these priority applications is incorporated by reference as if fully set out below.

BACKGROUND

Embodiments of the present invention relate to an eraser system for use with an a display system having a display surface with optical detection elements. In particular, exemplary embodiments relate to an eraser for use with an electronic whiteboard assembly with two or more optical detection elements for determining the coordinates of the eraser relative to its display surface.

Whiteboards are a well-known medium for facilitating the exchange of information by providing a convenient surface upon which notes, drawings, charts, or other notations may be made. As with the traditional chalkboard, whiteboards allow notations to be made in multiple colors and to then be erased. Whiteboards offer several advantages over chalkboards including a clean white surface that provides for greater contrast over the traditional green or black background of chalkboards. In addition, writing on a whiteboard is easier for many than on the traditional chalkboard. For example, the smooth writing surface of the whiteboard allows easy use of the erasable felt tip markers used on whiteboards, whereas the chalkboard surface provides a somewhat scratchy surface to hold the chalk used for writing on such surfaces. In addition, many users prefer a whiteboard to a chalkboard simply because the marker may be gripped easier than chalk and does not mark the user's hand when gripped.

Recently, electronic whiteboards have been developed to allow the user's writings and notations entered upon the display surface of the whiteboard to be electronically captured and transmitted to a computer for storage, display, and manipulation. Such electronic whiteboards allow the images and notations made upon the whiteboard to be saved in the computer, to be displayed, printed, transmitted, or manipulated.

Yet, depending on the methods and devices used in the electronic whiteboard systems for detecting the position of an input device or, for example, an erasing device, some difficulty has been had in accurately detecting the location and orientation of the erasing device. Conventional electronic whiteboard systems provide such erasing devices for erasing digital markings of a pen or stylus, but as noted, erasing devices for such systems come with a number of disadvantages.

Various methods and devices for detecting the position of an input device/erasing device relative to the display surface of an electronic whiteboard have been previously developed. For example, position or pressure sensing input devices using tactile sensors have been employed in conventional electronic whiteboard systems. These conventional approaches, however, often are complex, difficult, or expensive to manufacture, and/or have limited performance, especially for large area input device applications. Camera-based systems are also known. Yet, eraser devices useful with camera-based systems are typically circular, to overcome orientation identification issues.

Rectangular erasers are traditionally provided for conventional non-electronic whiteboards, and are beneficial because they allow a user to erase either a large swath or a smaller portion with a single stroke, depending on how the eraser is oriented in the plane of the whiteboard surface. On the other hand, electronic whiteboard systems generally implement circular erasers. Rectangular erasers, while beneficial, require the electronic whiteboard system to determine the orientation as well as the placement of the eraser, as the area of erasure depends on both these variables. In contrast, orientation of a circular eraser is irrelevant because a circle covers the same space regardless of orientation. The user of an electronic whiteboard system with a circular eraser, however, may not be able to vary the size of the area erased in a single stroke. These circular erasers are large enough to erase the board easily, but may be unable to erase a single word, or are small enough to erase a word, but take an immense amount of effort to erase a large board.

With electronic whiteboard systems with optical detection elements, or camera-based systems, it is difficult to judge the orientation of a conventional rectangular eraser. For example, FIGS. 1A-1B illustrate that it is difficult to ascertain if the eraser is horizontally (position A) or vertically (position B) oriented. Such a two-potential-orientation-state eraser, identified herein as "eraser ghosting," is problematic, as proper erasure cannot be determined with definiteness. Each of the two eraser orientations presents two different user-intended erasure areas.

While conventional electronic whiteboard designs increase the versatility and useability of the traditional whiteboard, a need continues to exist for an electronic whiteboard with improved means for detecting input on the display surface from a user, associating the input with an image displayed on the whiteboard, and improved means for detecting an erasing device for accurate erasure of such inputs from the display surface. The embodiments described below are directed to these and other improvements over conventional systems, and namely to a rectangular eraser designed to be used with an optical electronic whiteboard, which can provide the system with accurate orientation information.

SUMMARY

Embodiments of the present invention are directed to an eraser useful with an electronic whiteboard system and assembly with optical detection elements. The electronic whiteboard system includes a writing/display surface and a retro-reflective perimeter surrounding the edge of the surface. A user can mark upon the surface or interact with an image displayed on the surface using an input device. The perimeter can reflect light beams emitted from optical detection elements located at the corners of the surface to identify the position of the input device relative to the writing surface and/or projected image.

In an exemplary embodiment, the electronic whiteboard system can comprise a writing surface, a first optical detection element in communication with the writing surface, and a second optical detection element in communication with the writing surface. For example, the two optical detection elements can be coupled to the corners of the writing surface and detect an input device by measuring decreases in the intensity of light emitted from the optical detection elements and reflected back by a retro-reflective perimeter surrounding the writing surface.

In an exemplary embodiment, an optical electronic whiteboard comprises two cameras located at opposite corners along one edge of the whiteboard surface, and a reflecting means that runs around the three perimeter edges not including the perimeter edge between the two cameras. An illumination source (at each camera in an exemplary embodiment) illuminates the reflectors.

Light travels from an illumination source to the reflective edges and back to the camera. When no object is on the board, a camera sees a continuous light pattern encircling the board. When an object (finger, stylus, marker, or eraser) touches the board, it penetrates the light path, interrupting it. The camera can thereby determine the angular position of the object across its field of view. With two or more cameras, an exact (X, Y) location of the object can easily be triangulated.

Embodiments of the eraser can comprise an eraser pad and a mounting block, optionally with a separate handle for ease of holding/manipulating. The mounting block can have a plurality, preferably four, faceted interior "windows". Each interior window can comprise a reflector, such that at any point in time, at least one of the two or more cameras of the system can "see" at least one reflector, wherein eraser ghosting is eliminated. The windows can be located behind an infrared transmissive and visible light-blocking cover when infrared light is used for the coordinate detection.

These and other features as well as advantages, which characterize various exemplary embodiments of the present invention, will be apparent from a reading of the following detailed description and a review of the associated drawings.

BRIEF DESCRIPTION OF THE DRAWINGS

FIG. 4A illustrates a bottom of an eraser, in accordance with an exemplary embodiment of the present invention.

FIG. 4B illustrates a perspective view of the eraser, in accordance with an exemplary embodiment of the present invention.

FIG. 4C illustrates a bottom view of the eraser, in accordance with an exemplary embodiment of the present invention.

FIGS. 7A-12C illustrate exemplary embodiments of an eraser, in accordance with an exemplary embodiment of the present invention.

FIGS. 14A-B illustrate cones of accurate reflection for various configurations of retro-reflective portions of windows of an eraser, in accordance with exemplary embodiments the present invention.

DETAILED DESCRIPTION

Figure 1A:
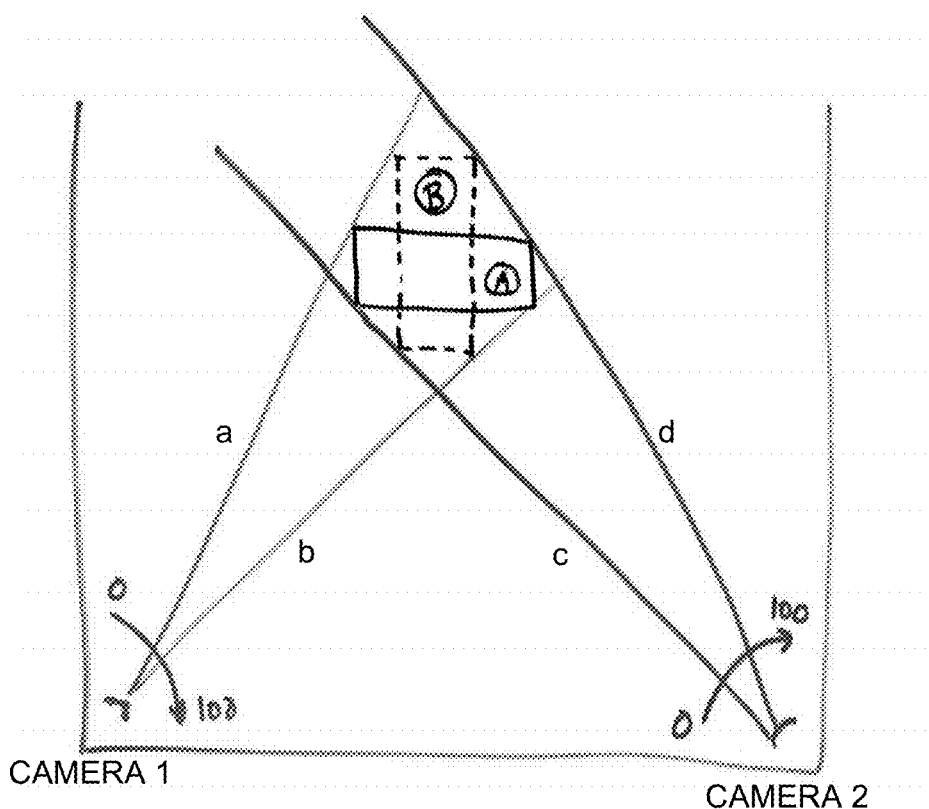
FIGS. 1A and 1B illustrate a conventional problem of accurately determining the orientation of a conventional rectangular eraser when used with an optically sensing electronic whiteboard system.
Figure 1B:
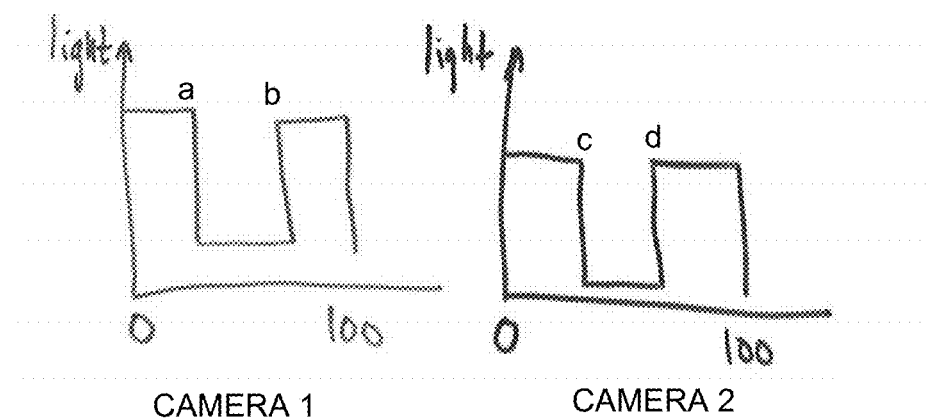
Figure 2:
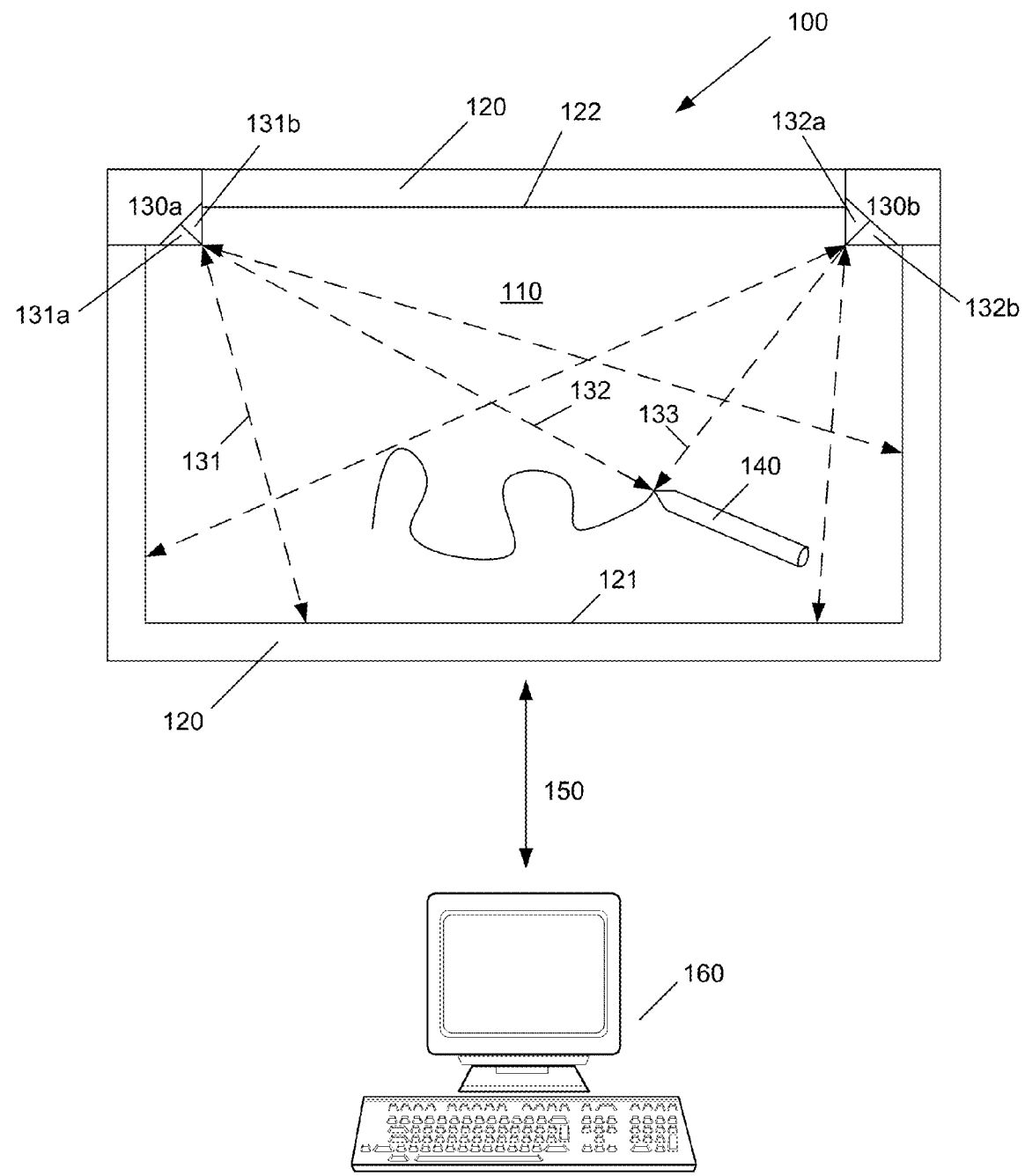
FIG. 2 illustrates an electronic whiteboard system, in accordance with an exemplary embodiment of the present invention.

Referring now in detail to the drawing figures, wherein like reference numerals represent like parts throughout the several views, FIG. 2 illustrates an exemplary embodiment of an electronic whiteboard system 100. The electronic whiteboard system 100 can comprise a display surface 110, a perimeter 120, and one or more optical detection elements. In the exemplary embodiment illustrated, the electronic whiteboard system 100 comprises a first optical detection element 130a and a second optical detection element 130b. For viewing ease, the electronic whiteboard system 100 can be vertically mounted on a surface such as a wall.

In an exemplary embodiment, the display surface 110 can be substantially similar to the writing surface of a conventional dry erase whiteboard. A user can provide an input onto the display surface 110 using an input device 140. The input device can be a felt tip-marker, a pointer, a stylus, the user's finger, an eraser, or other suitable implements. In an exemplary embodiment, the input device 140 can be a dry erase marker.

As the user provides an input or marks in proximity to or upon the display surface 110 using the input device 140, the first and second optical detection element 130a and 130b can detect the position of the input device 140 relative to the display surface 110. The various positions of the input device 140 can be used to determine the input provided by the user.

Optical detection element 130a can comprise an emitter 131a and a receiver 131b. Similarly, optical detection element 130b can comprise an emitter 132a and a receiver 132b. Emitters 131a and 132a can emit electromagnetic radiation such as an infrared light beam. In an exemplary embodiment, the emitters 131a and 132a can be an infrared light emitting diode (LED). Correspondingly, receivers 131b and 132b preferably can detect an infrared light beam. In other embodiments, the emitters 131a and 132a can be ultrasonic or another suitable form of energy and the receivers 131b and 132b preferably are capable of detecting said energy. In an exemplary embodiment, the optical receiver elements 131b and 132b can be coupled charge device (CCD) cameras, or linear CCD camera systems.

The optical detection elements 130a and 130b can be in communication with, disposed on, or coupled to the front or back of the perimeter 120 or the display surface 110. In other embodiments, the optical detection elements 130a and 130b can have a mounting assembly enabling attachment to a surface other the display surface 110 or the perimeter 120, such as a wall. In one embodiment, optical detection elements 130a and 130b can be coupled or disposed at the upper corners. In other contemplated embodiments, the optical detection elements 130a and 130b can be coupled to the lower or side corners.

The perimeter 120 can extend around edges of the display surface 110. In addition, the perimeter 120 can extend above the plane of the display surface 110 to define an interior perimeter surface 121 normal to the plane of the display surface 110. The interior perimeter surface 121 can have retro-reflective characteristics. In one embodiment, the interior perimeter surface 121 can have a retro-reflector along its length. In other embodiments, the retro-reflector need not be disposed along the entire interior perimeter surface 121. For example, the top side 122 of the interior perimeter surface 121 does not need to be retro-reflective for the system to operate.

The interior perimeter surface 121 can reflect an infrared light beam emitted by the emitters 131a and 132b of optical detection elements 130a and 130b back along a vector that is parallel to but opposite in direction from the angle of incidence of the beam. Consequently, a beam 131 emitted from first optical detection element 130a can be reflected by the interior perimeter surface 121 directly back to the optical detection element 130a and detected by a receiver. Retro-reflective materials can be capable of retro-reflecting light beams back within a certain angle of incidence. The portions interior perimeter surface 121 that are at high angle of incidence relative emitters 131a and 131b of optical detection elements 130a and 130b can be adapted to facilitate reflection. For example, said portions of the perimeter surface 121 could comprise wide angle retro-reflective material or can be curved, angled, corrugated, or otherwise altered to increase reflection.

The optical detection elements 130a and 130b each can have a field of view that includes a detection area defined by the bottom horizontal portion of the interior perimeter surface 121 and the majority of the vertical portion of the interior perimeter surface 121 opposite said element. In this manner, the field of view of the first optical detection element 130a substantially overlaps with the field of view of the second optical detection element 130b. The detection area is preferably two dimensional, which enables detecting presence of an object in proximity to or in contact with the display surface 110. This also reduces the flatness requirement of the surface. The pixel dimension of the optical detection elements 130a and 130b can be selected to achieve the desired field of view.

The optical detection elements 130a and 130b both emit a plurality of infrared beams onto their respective detection areas. The emitted beams are reflected by the interior perimeter surface 121 back to the receivers of the optical detection elements 130a and 130b. The optical detection elements 130a and 130b can simultaneously emit a plurality of beams onto their entire detection areas. Alternatively, the optical detection elements 130a and 130b can rapidly scan across their respective detection areas, illuminating a portion of the detection area at one time.

The optical detection elements 130a and 130b can detect the input device 140 in contact with or in proximity to the display surface 140. The surface of input device 140 is not reflective or substantially less reflective than the interior perimeter surface 121. Consequently, an input device 140 effectively blocks certain beams emitted from optical detection element 130a and 130b from being reflected back to the optical detection elements 130a and 130b by the interior perimeter surface 121. This absence of reflected beams can be detected by the receivers of the optical detection elements 130a and 130b as a point of lower intensity in the detection area. For example, in FIG. 2, input device 140 blocks beams 132 and 133. Consequently, these beams will only partially be reflected back to the optical detection elements 130a and 130b and a reduction in intensity will be detected by the receivers in comparison to the beams reflected by the interior perimeter surface 121.

The electronic whiteboard system 100 can be in communication with a computation device 160 via a communication link 150. The computation device 160 can be a personal computer (PC), laptop, personal digital assistant, tablet PC, room booking system, Smartphone, or another suitable electronic device capable of executing an operating system. The communication link 150 can be a wireless link such as infrared, radio-frequency, or another suitable wireless communication protocol. Alternatively, the communication link 150 can be a hardwire link such as USB, USB 2.0, firewire, serial cable, coaxial cable, or another suitable electronic communication cable. In further embodiments, the electronic whiteboard system 100 and computation device 160 can be part of a local area network (LAN) or connected through a network, such as a LAN. In alternative embodiments, the computation device 160 can be integrated into the electronic whiteboard system 100.

The computation device 160 can comprise software and data relating to the electronic whiteboard system 100 that enables it to record markings made by a user on the display surface 110. The computation device 160 can have data relating to a baseline reading of light beams detected by the receivers 131b and 132b of the optical detection elements 130a and 130a when an input device 140 is not in contact or proximity to the display surface 110. The computation device 160 can receive actual light beam detection readings from the electronic whiteboard system 100 and compare these readings to the base line readings. A decrease in the intensity of the light readings can indicate the presence of an object, such an input device or eraser. Comparing the readings from the both the first and second optical detection elements 130a and 130b, the computation device 160 can triangulate the position of the input device 140 relative to the display surface 140. Comparing multiple successive readings, the computation device 160 can determine a marking, such as a letter or scribble, made upon the display surface. It can also record multiple simultaneous touch points to allow gestural interfaces or allow two people to write on the board simultaneously.

Figure 3:
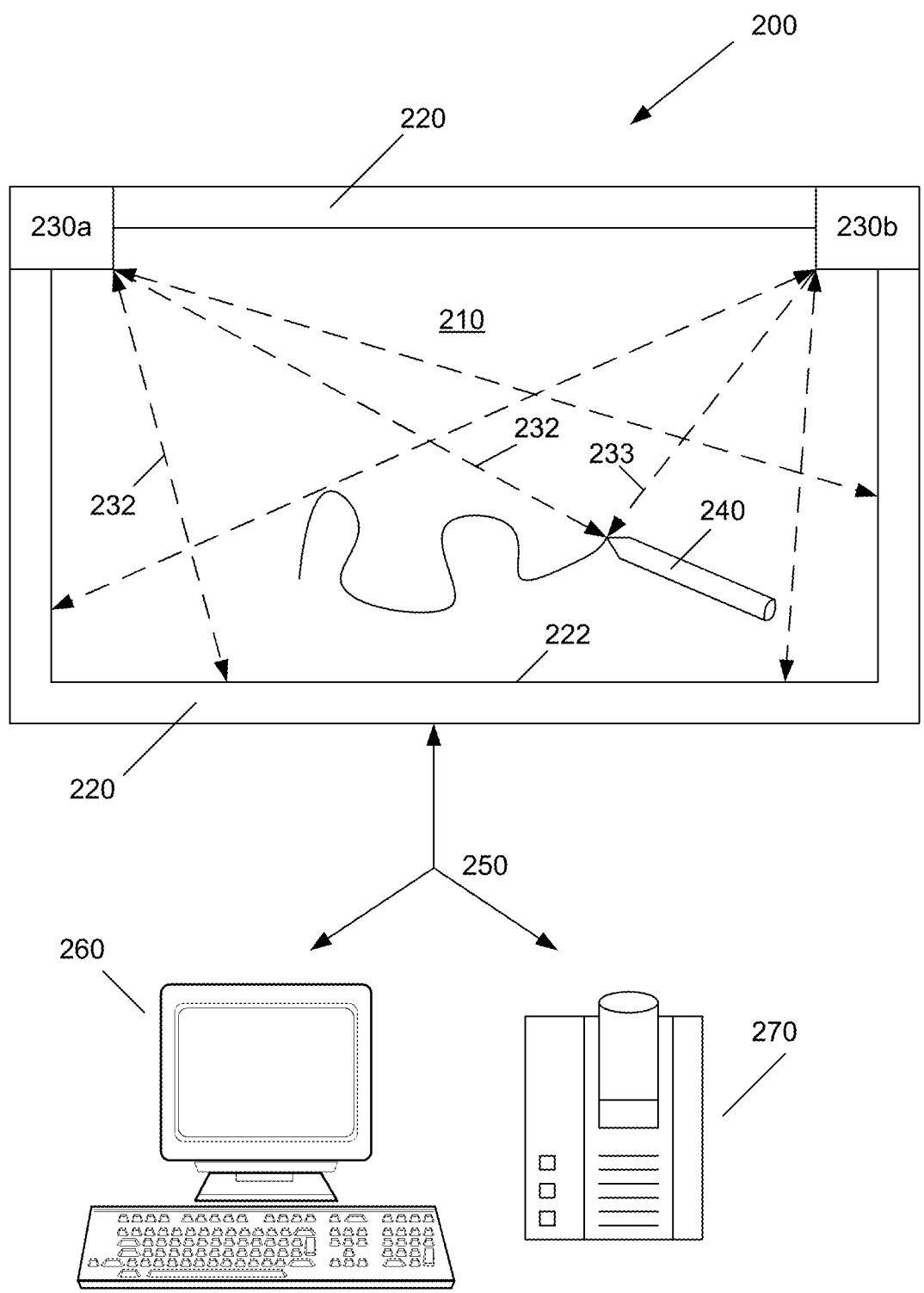
FIG. 3 illustrates an electronic whiteboard system for use with a projector, in accordance with an exemplary embodiment of the present invention.

FIG. 3 illustrates an embodiment of an electronic whiteboard system 200 for use with a projector 270. The electronic whiteboard system 200, computation device 260, and projector 270 can be in communication with each other via a communication link 250. The communication link 250 can be substantially similar to the communication link described above. The communication link 250 can be a single link between the system 200, projector 270 and computation device 260. In other embodiments, the communication link 250 can be two separate links, a first link between the system 200 and the computation device 260 and a second link between the computation device 260 and the projector 270. In an exemplary embodiment, the projector 270 can manifest a screen or desktop image, for example, a graphical user interface (GUI), from the computation device 260 onto the display surface 210. The electronic whiteboard system 200 can be calibrated to determine its position relative to the display surface. Further, the computation device 260 can correlate the position of the projected image relative the display surface 210 with the position of an input device 240. This can enable a user to interact with the projected image through the electronic whiteboard system 200 in a variety of ways. For example, a user can manipulate an image of a projected desktop using an input device 240 that functions as a mouse cursor. The user can open and close programs by pointing and "clicking" on the display surface using the input device 240 as if seated at the computation device 260.

FIGS. 4A-4B illustrate an eraser device 300 useful with an electronic whiteboard system 200. The eraser device 300 comprises an orientation identification system 310 that reduces or eliminates eraser ghosting that arises with use of conventional rectangular erasers with camera-based systems.

An eraser will block the retro-reflectors of the whiteboard system in the same way that a pen will, in that for a simple rectangular eraser, the system gets a start and end angle for each camera. It would be preferred that there would only be one location and angle of the eraser that could produce these angles, but this is not the case with a conventional rectangular eraser.

Figure 5:
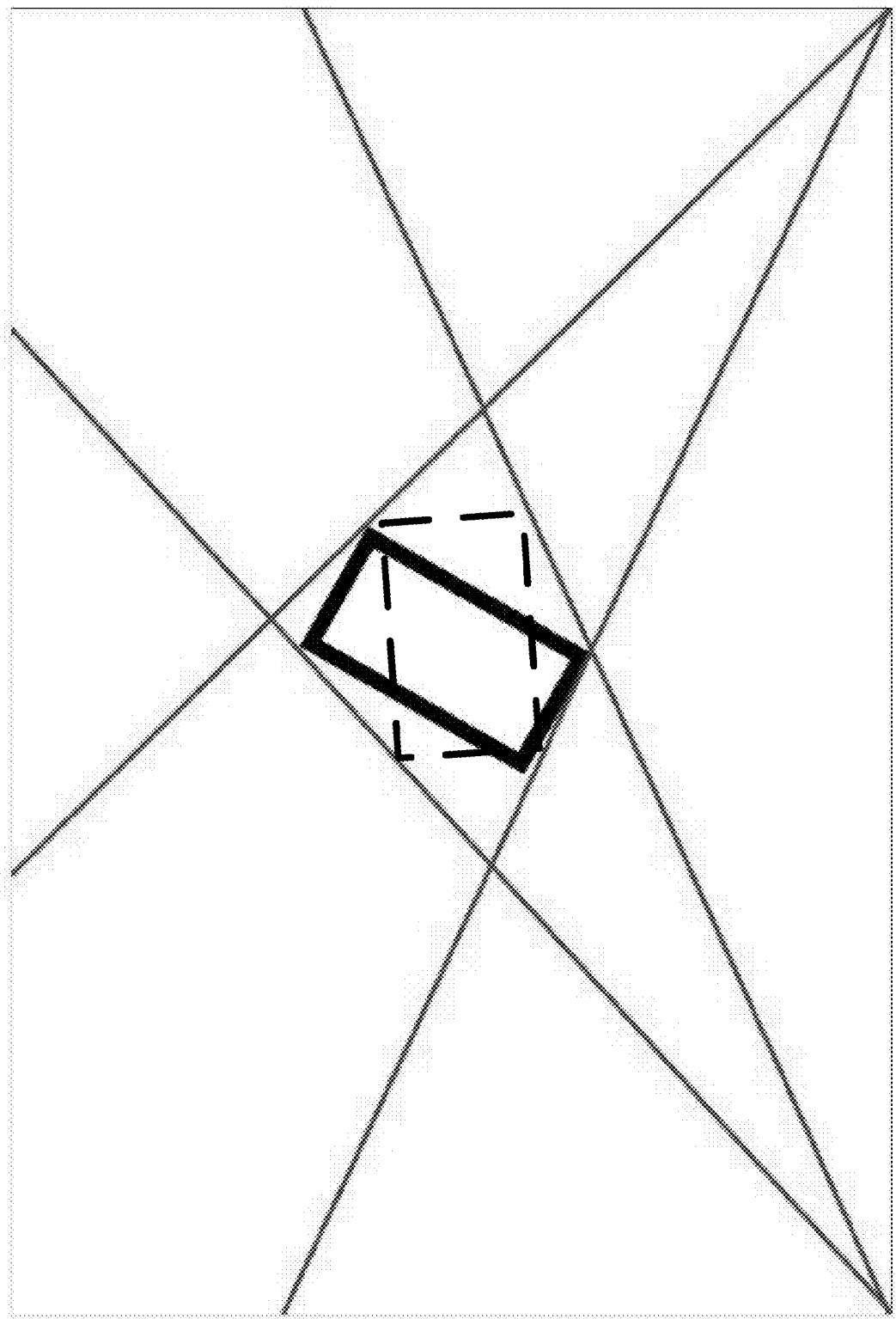
FIG. 5 illustrates a conventional problem of accurately determining the orientation of a conventional rectangular eraser when used with an exemplary embodiment of an electronic whiteboard system.

In many areas of the board, and at many angles, there are two angles of the erasers that will produce the same view as seen from the cameras. This makes it hard for the system to choose between the two possible states of the eraser (duplicative states), for the system to identify which is the "real" location/orientation of the eraser, and which is a "ghost". Thus, with a conventional eraser, there are times when a camera-based system can identify the location of the eraser within which the eraser can occupy one of two orientations. For example, as shown in FIG. 5, this particular arrangement of cameras and eraser, two possible orientations for the captured eraser exist, and thus the system cannot accurately determine the indicia to be erased.

As the user moves the eraser about the board, there are indeed clues as to which is the real eraser and which is the ghost, which upon a state of a future event of moving the eraser, the system could conceivably move back in time and accurately identify the previously correct state (orientation) of the eraser when it was in its previous duplicative state, but such a solution is mainly software driven, whereas providing an eraser device with a orientation identification system 310 is not as processor intensive.

It also is possible to limit the ghosting problem not just with a software solution, but by, for example, changing the aspect ratio of the eraser, to a long thin eraser, which will have much fewer cases of eraser ghosting than a short fat eraser, but even with a long thin eraser, ghosting is not eliminated. By adding an orientation identification system 310 to the eraser, the ghosting problem is effectively eliminated.

An exemplary embodiment of an orientation identification system 310 is a system provided to an eraser that provides eraser position/orientation data to the whiteboard system that eliminates eraser ghosting, such that when an eraser is used upon the surface, at all times the eraser with an orientation identification system 310 informs the system of its location and orientation.

An exemplary embodiment of an orientation identification system 310 is the provision of retro-reflectors on the eraser 300, which provide the camera-based system with data sufficient to eliminate areas on the whiteboard where the eraser can be in a one of two orientations. In this embodiment, the orientation identification system 310 provides the system with reflection (light areas) useful in cooperation of the typically dark areas of the remainder of the non-reflective portions of the eraser. The location of the eraser 300 thus can be triangulated by the location of the dark areas in the view of each camera. The orientation of the eraser can be determined by the pattern received from each camera.

The retro-reflectors should be in a length(s) and location(s) in order to overcome the loss of retro-reflective properties at certain angles of incidence. That is, eraser ghosting will not be eliminated if an eraser 300 is provided with retro-reflective materials, but in a way that there remain certain orientations of the eraser that effectively eliminate the usefulness of the retro-reflectors used, because they are not capable of reflecting the light beams back outside the cone of accurate retro-reflection.

Figure 13:
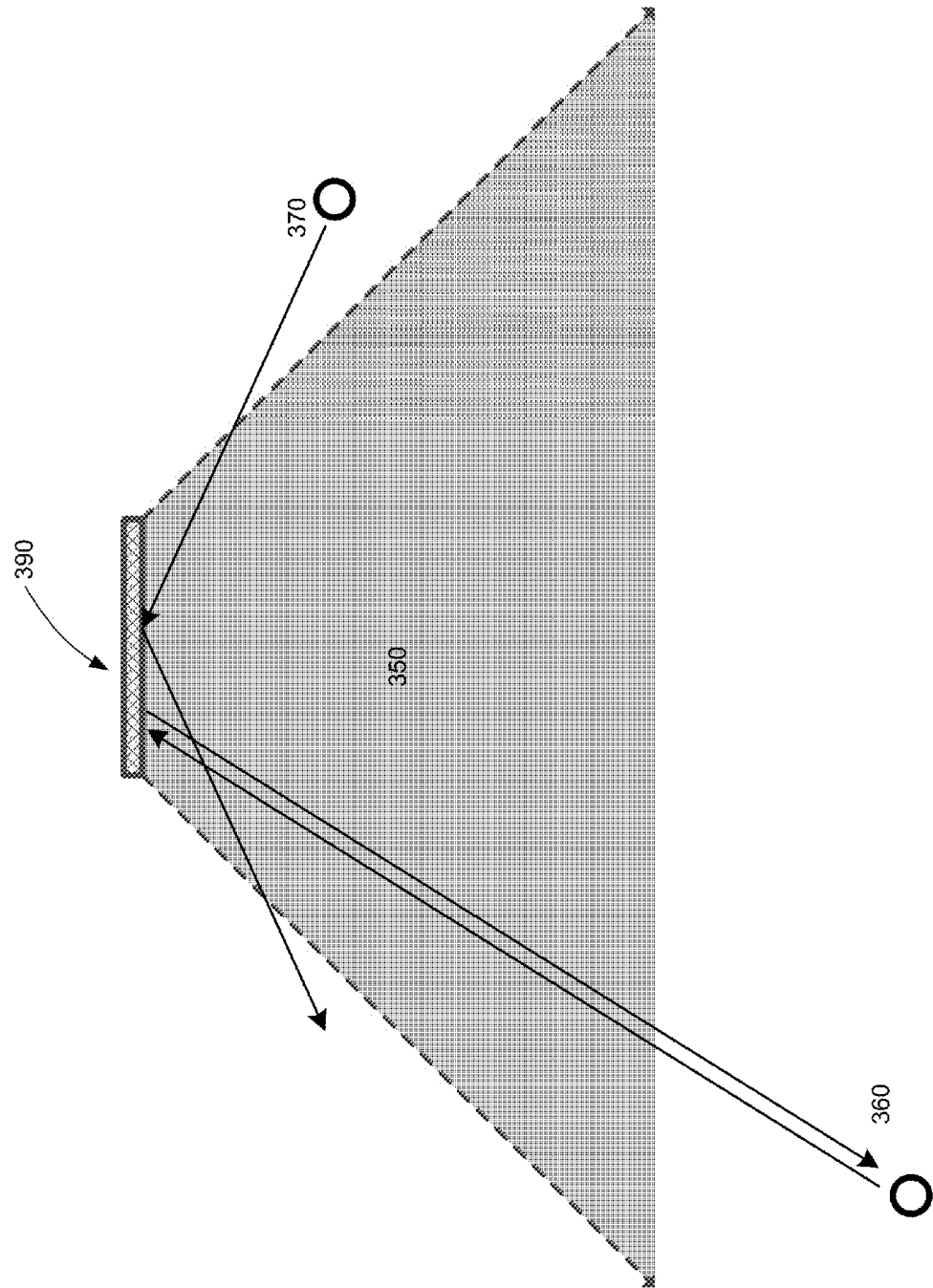
FIG. 13 illustrates a cone of accurate reflection of a retro-reflector, in accordance with an exemplary embodiment the present invention.

FIG. 13 illustrates a cone of accurate reflection 350 of a retro-reflector 390, in accordance with an exemplary embodiment the present invention. As shown in FIG. 13, a light beam originating from a point 360 within a cone of accurate retro-reflection 350 of the retro-reflector 390 can be reflected back to that point by the retro-reflector 390. A light beam originating from a point 370 outside the cone of accurate reflection 350 of the retro-reflector 390 will not be reflected back to that point.

Referring back to FIGS. 4A-4B, an exemplary embodiment of an orientation identification system 310 is the provision of one or more windows 320 in the eraser 300, each window formed of one or more angled surfaces 330, at least a portion of which are retro-reflecting. Each window is shown located in proximity to the short end of the eraser, but the spacing is variable. In this embodiment, the issues of loss of retro-reflection properties are effectively negated, as there is always presented a surface 330 that remains retro-reflective. As shown in FIG. 4C, In another embodiment, the orientation identification system 310 can include an outwardly extending member 315, which incorporates the retro-reflector.

Figure 14B:
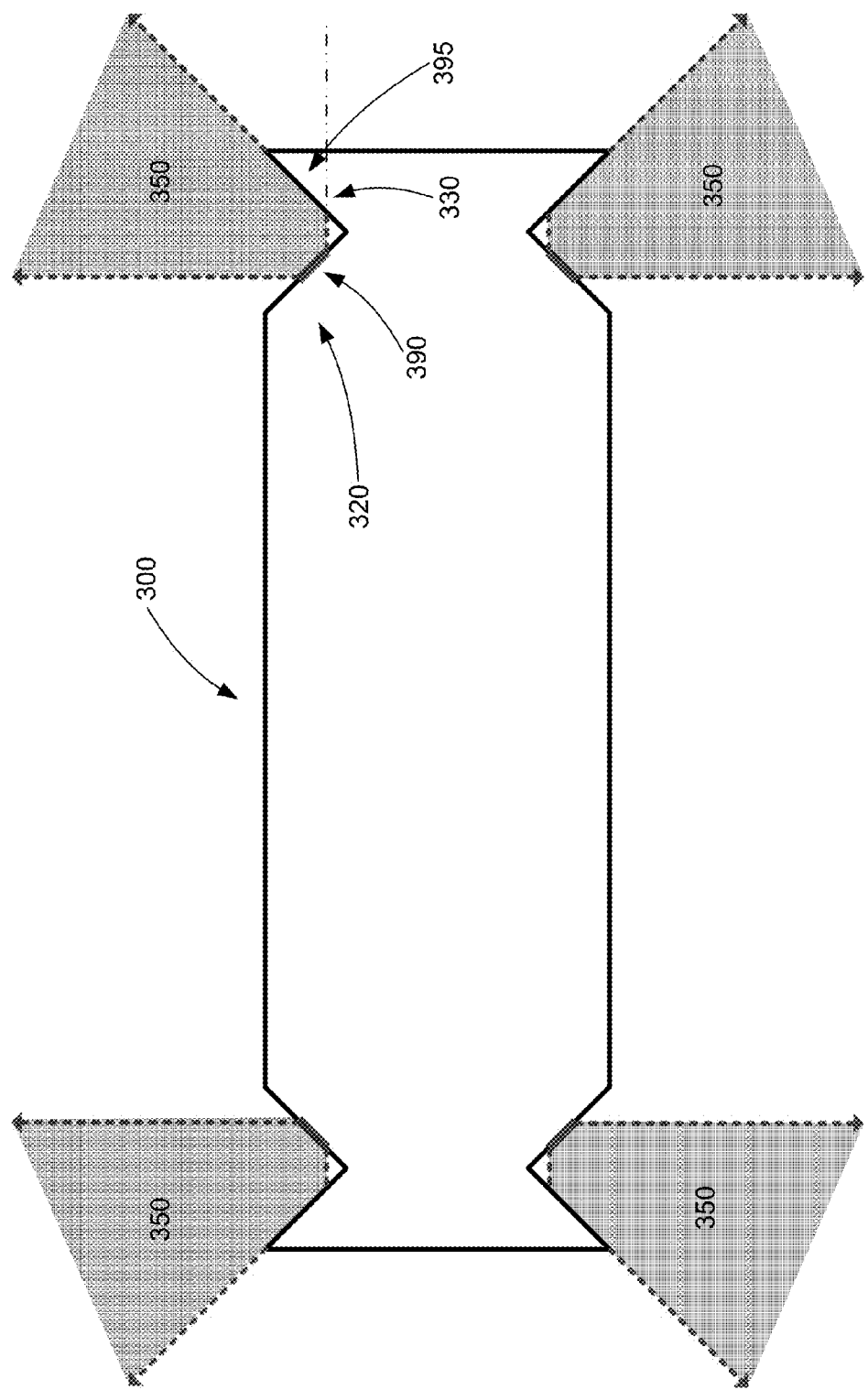

FIGS. 14A-B illustrate cones of accurate reflection 350 for various configurations of retro-reflective portions 390 of windows 320 of an eraser 300, in accordance with exemplary embodiments the present invention. As shown in FIG. 14B, an angled surface 330 of a window 320 with a retro-reflective portion 390 can partially occlude 395 a cone of accurate reflection 350 of the retro-reflective portion 390.

Figure 6A:
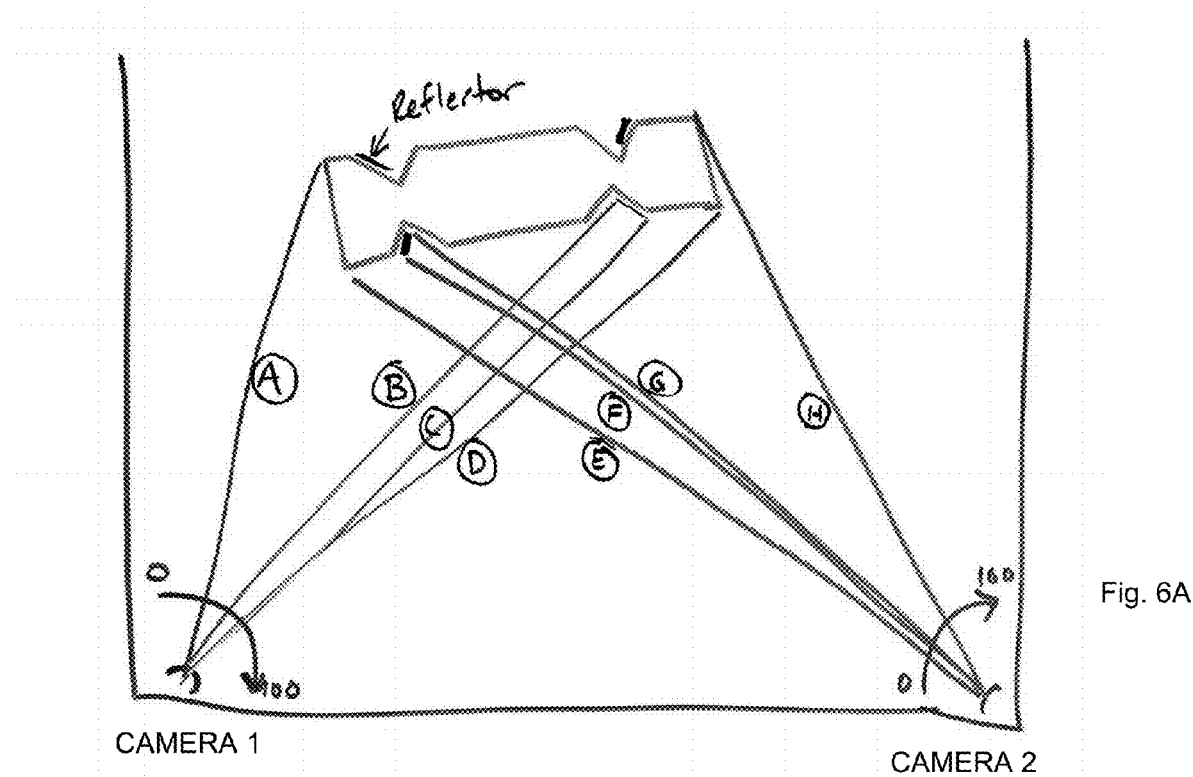
FIGS. 6A and 6B illustrate how an exemplary embodiment of the present invention properly identifies the orientation of an eraser, in accordance with an exemplary embodiment of the present invention.
Figure 6B:
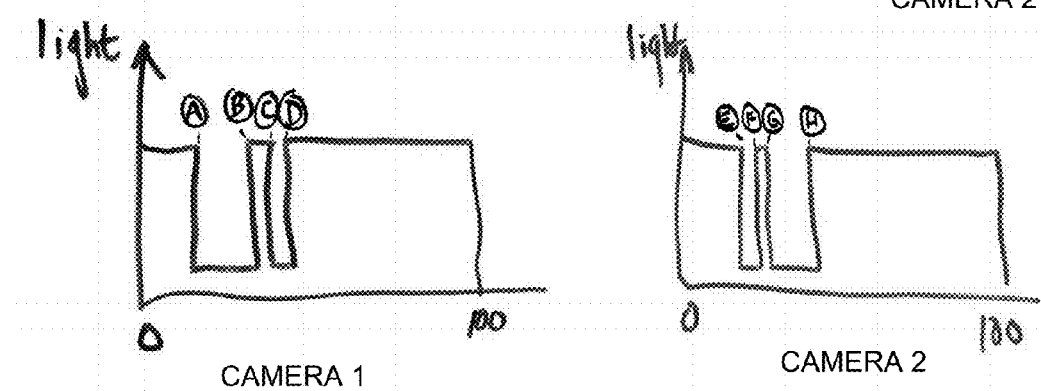
Figure 7B:
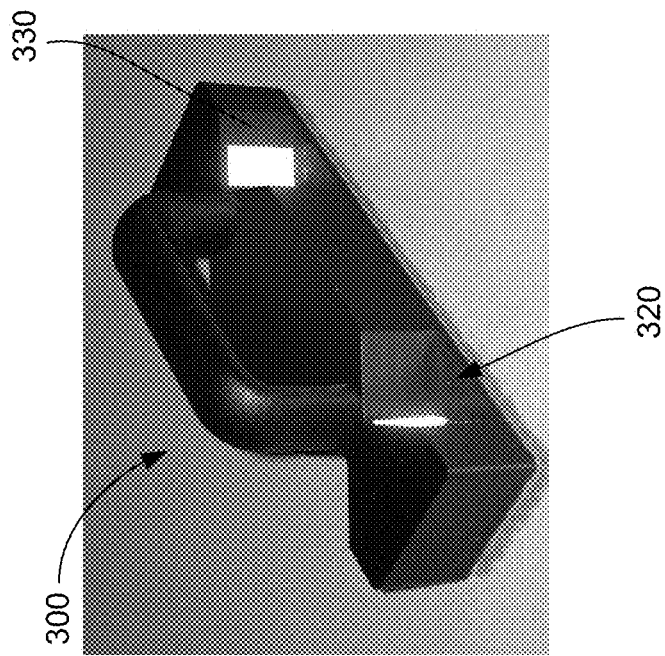
Figure 7A:
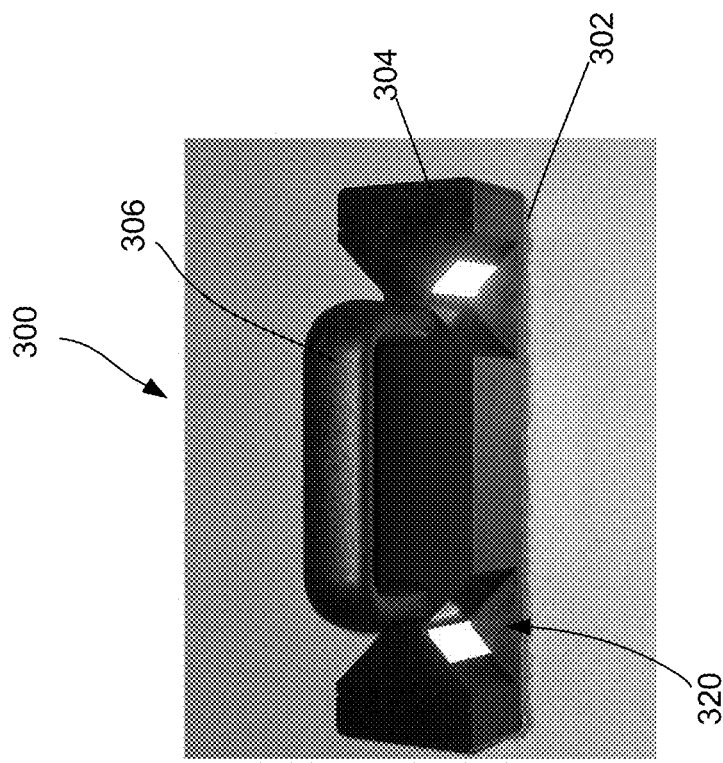
Figure 8:
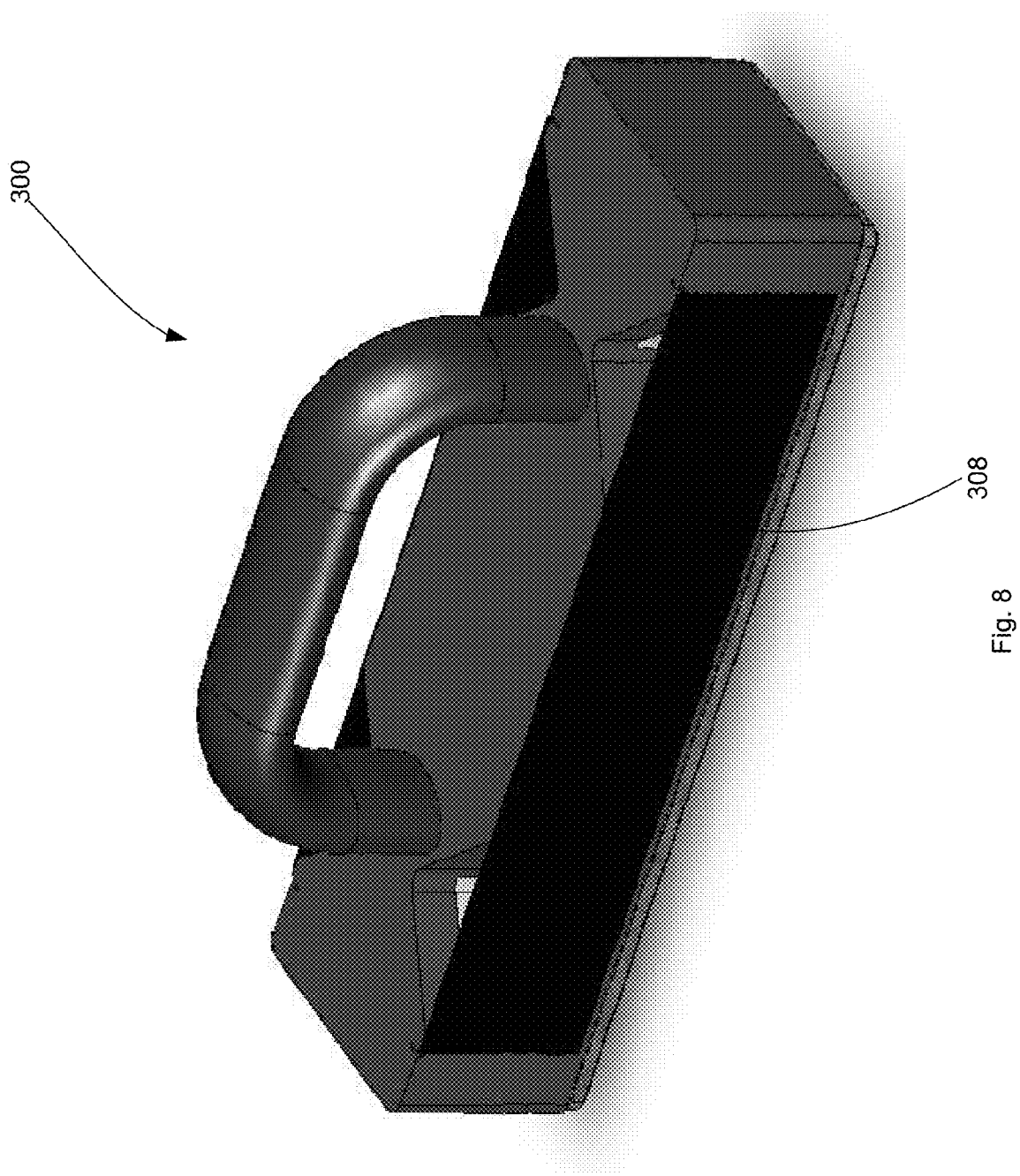
Figure 9:
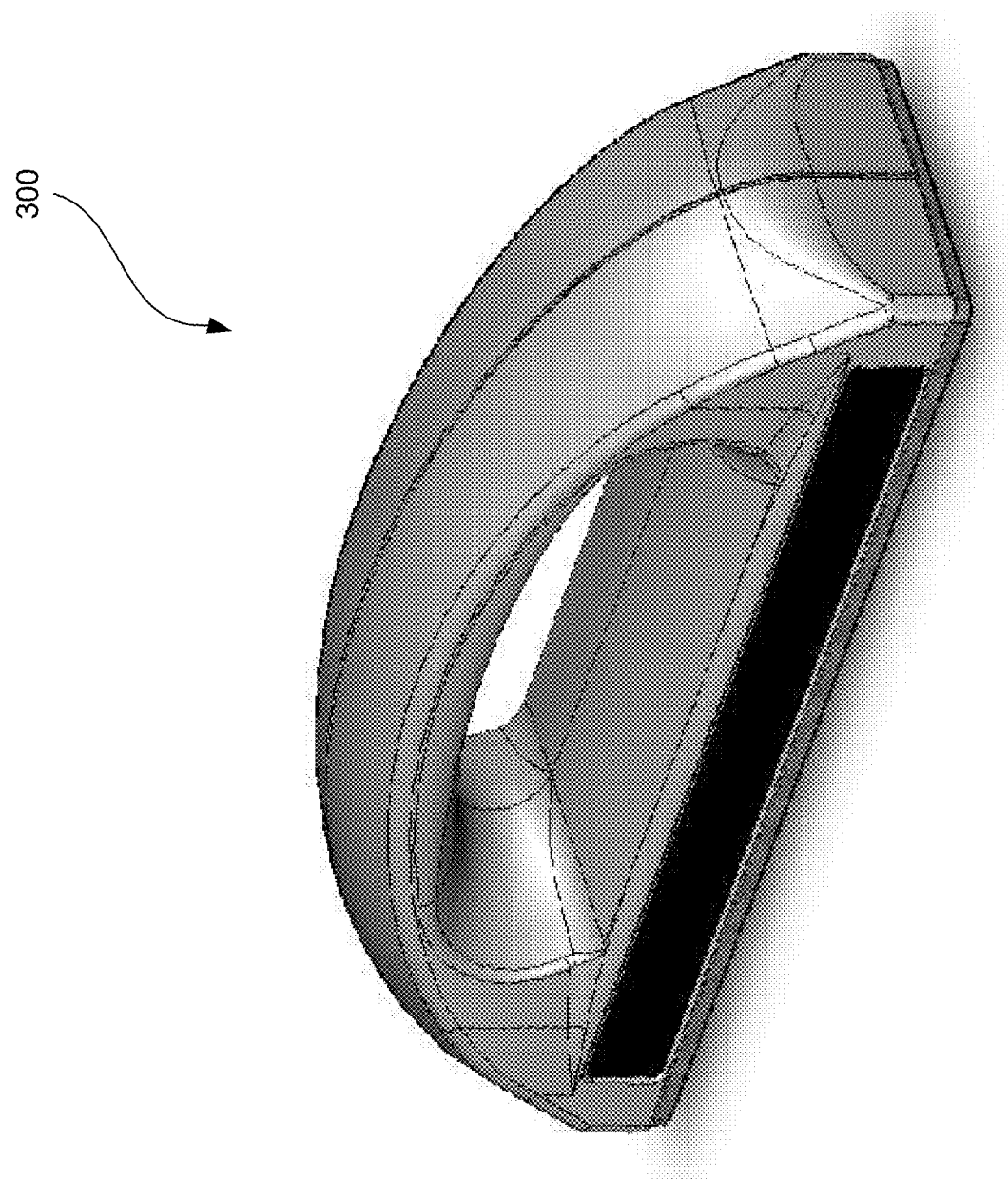
Figure 10:
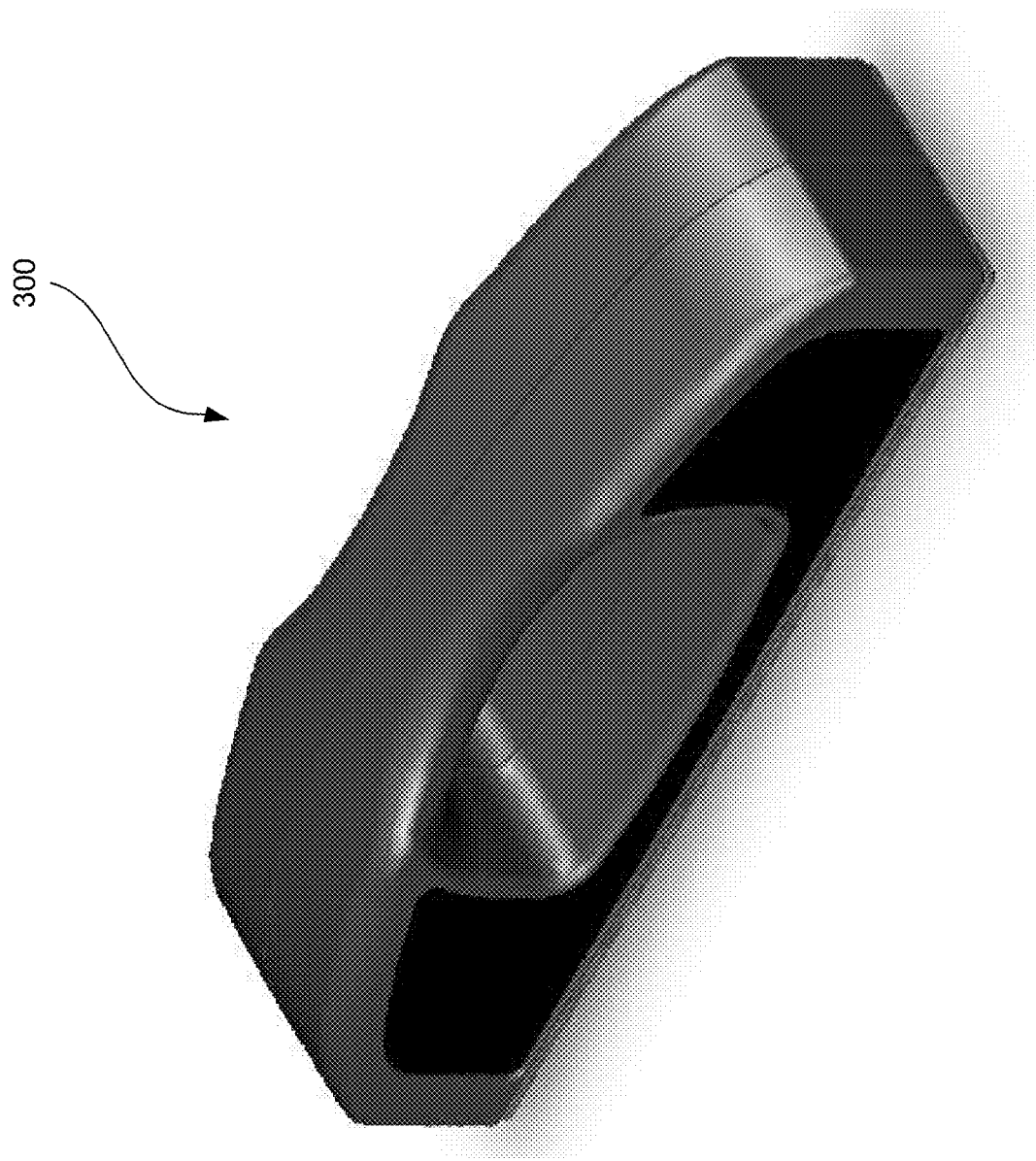

As shown in example form in FIGS. 6A-6B, the pattern of the light tells the system that it sees an eraser, as well as the location of the reflectors in the eraser windows. The size of the image of the reflectors in the eraser window tells the system which of the two possible orientations the eraser is in. In particular, the charts of FIG. 6B illustrate the amount of light detected by the optical detection elements, which for simplicity are labeled as CAMERA 1 (in the lower left hand corner of the whiteboard) and CAMERA 2 (in the lower right hand corner of the whiteboard).

Referring to the chart identifying the light detected by CAMERA 1, starting from the left side of the perimeter of the whiteboard, CAMERA 1 views the light emitted by the emitter and reflected back to the receiver. As the CAMERA 1 view spans to the right, it ultimately reaches point A, which as depicted in FIG. 6A is a corner of the eraser. From point A to point B, CAMERA 1 sees an absence of light, as a portion of the eraser blocks the light emitted by the emitter, and hence little to no light is reflected back to the receiver. Continuing along CAMERA 1's view, from point B to point C light emitted by the emitter is reflected back to the receiver by the eraser's reflector, and hence in the chart of CAMERA 1 in FIG. 6B, the light received by the receiver is illustrated with the spike. From point C to point D, there is again an absence of light being reflected back to the receiver, which in FIG. 6B is shown by the dip in the chart. After point D and through the remaining 90 degrees of viewing area of CAMERA 1, the most, if not all, the light emitted by the emitter is reflected back to the receiver.

As for CAMERA 2 of FIGS. 6A-6B, starting from the bottom side of the perimeter of the whiteboard, CAMERA 2 views the light emitted by the emitter and reflected back to the receiver. As the CAMERA 2 view spans to the right, it ultimately reaches point E, which as depicted in FIG. 6A is a corner of the eraser. From point E to point F, CAMERA 2 sees an absence of light, as a portion of the eraser blocks the light emitted by the emitter, and hence little to no light is reflected back to the receiver. Continuing along CAMERA 2's view, from point F to point G light emitted by the emitter is reflected back to the receiver by the eraser's reflector, and hence in the chart of CAMERA 2 in FIG. 6B, the light received by the receiver is illustrated with the spike. From point G to point H, there is again an absence of light being reflected back to the receiver, which in FIG. 6B is shown by the dip in the chart. After point H, which is another corner of the eraser, and through the remaining 90 degrees of viewing area of CAMERA 2, most, if not all, the light emitted by the emitter is reflected back to the receiver.

FIGS. 7A-12 illustrate various exemplary embodiments of the present eraser.

An exemplary embodiment of an orientation identification system 310 is the provision of four windows 320 in the eraser 300, two located on each long side of the eraser, each window formed of two, 90° angled surfaces 330, at least a portion of which are retro-reflecting.

The result of the windows 320 is that each camera used in the system will only see one window, and by where the cameras see the reflectors, the system can tell with precision which is the real eraser and which is the ghost.

An exemplary embodiment of the eraser 300 comprises an eraser pad 302 and a mounting block 304, optionally with a separate handle 306 for holding. The mounting block 304 incorporates the orientation identification system 310, being four faceted inside windows 320. Each inside window 320 contains a reflector 330, such that at any point in time, one of the at least two cameras can see at least one reflector 330.

Other arrangements of the windows 320 can be provided. These windows 320 can also be located behind an infrared transmissive and visible light-blocking cover 308 when infrared light is used for the coordinate detection.

Figure 11B:
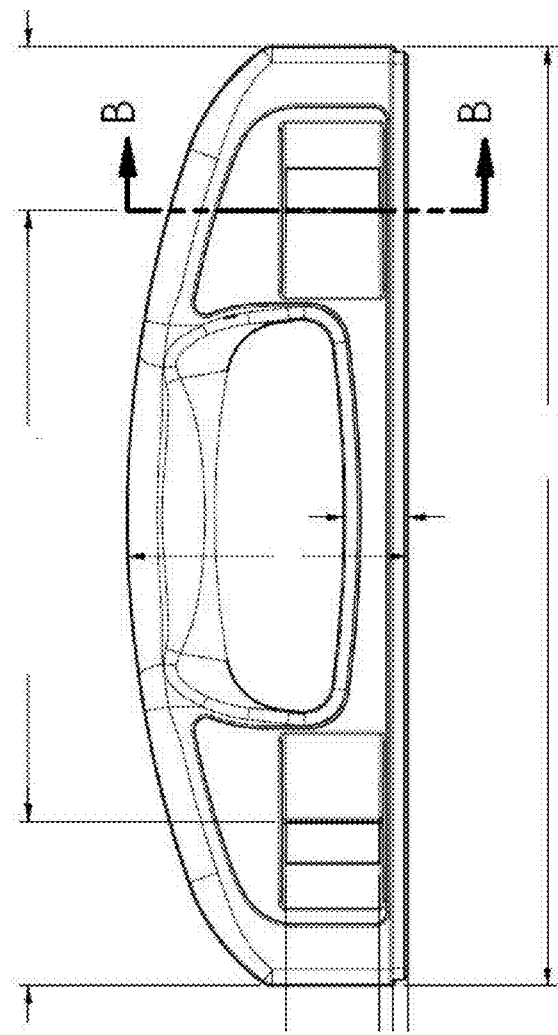
Figure 11C:
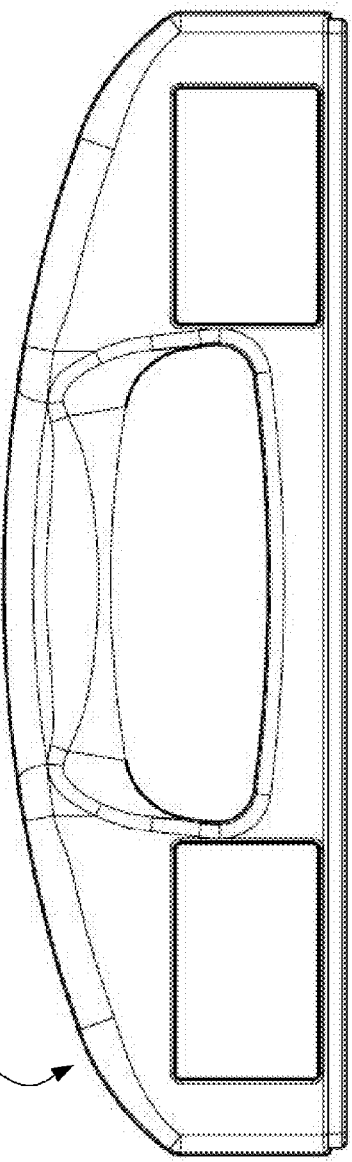
Figure 11A:
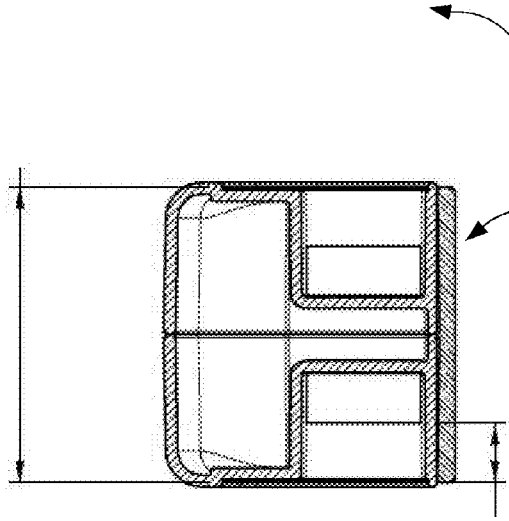

It has been found that in an exemplary four window 320 embodiment, an optimum placement of each of the four windows (two on each side) about the eraser is between 17-21% of the length of the eraser 300 from each end. As shown in FIG. 11 to scale, in an exemplary embodiment, the windows 320 are centered about a line approximately 18% of the length of the eraser 300 from each end. As shown in FIG. 12 to scale, in an exemplary embodiment, the windows 320 are centered about a line approximately 20% of the length of the eraser 300 from each end.

The size and number of windows can vary. There could also be different colors for the reflectors in the windows, and a means to detect the color. The windows could be covered with a cover that only transmits light at the frequency of the illumination source (e.g. infrared). The windows also could be made thinner (closer to the board surface). The windows could also be "holes" through which the reflector on the perimeter whiteboard is viewed. The windows could also comprise mirrors that reflected the light from a different part of the board.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

What is claimed is:

1. An erasing device for reducing eraser ghosting in an electronic whiteboard system comprising a writing surface and two or more optical detection elements, the erasing device comprising:
    a body;
    at least two retro-reflectors configured to retro-reflect light beams incident at an angle within a predetermined cone of accurate retro-reflection; and
    an orientation identification system wherein the retro-reflectors are disposed on the body of the erasing device such that each optical detection unit of the electronic whiteboard system detects retro-reflected light beams from no more than one of the retro-reflectors in substantially all orientations of the erasing device when the body of the erasing device is in proximity to the writing surface.

2. The erasing device of claim 1, the orientation identification system comprising at least two windows, each window comprising a concave cavity in the body of the eraser device comprising at least two angled surfaces, and one of the at least two retro-reflectors.

3. The erasing device of claim 2, wherein a first window of the one or more windows comprises a cover configured to at least partially block a first wavelength of light but permit a second wavelength of light, and wherein the retro-reflector associated with the first window is configured to retro-reflect the second wavelength of light.

4. The erasing device of claim 3, wherein the first wavelength of light is with a range of visible light and the second wavelength of light is within a range of infrared light.

5. The erasing device of claim 2, wherein each window is primarily formed by two surfaces disposed at approximately a 90° to each other.

6. The erasing device of claim 2, wherein the at least two windows are four windows.

7. The erasing device of claim 1, wherein each retroreflector faces a different direction from the other retroreflective surfaces.

8. The erasing device of claim 1, the first retroreflector adapted to retroreflect a light beam emitted from a first optical detection element of the two or more optical elements back to the first optical detection element and the second retroreflector adapted to retroreflect a light beam emitted from a second optical detection element of the two or more optical detection elements back to the second optical detection element.

9. An erasing device for reducing eraser ghosting in an electronic whiteboard system comprising a writing surface and two or more optical detection elements, the erasing device comprising:
    a body;
    at least two retroreflectors configured to retroreflect light beams incident at an angle within a predetermined cone of accurate retroreflection; and
    an orientation identification system comprising one or more windows, wherein each window comprises a concave cavity in the body of the erasing device primarily comprising two planar surfaces disposed at a predetermined angle to each other, at least a portion of which surfaces comprise the retroreflectors.

10. The erasing device of claim 9, wherein a first window of the one or more windows comprises a cover configured to at least partially block a first wavelength of light but permit a second wavelength of light, and wherein the retroreflector associated with the first window is configured to retroreflect the second wavelength of light.

11. The erasing device of claim 10, wherein the first wavelength of light is with a range of visible light and the second wavelength of light is within a range of infrared light.

12. The erasing device claim 9, wherein the windows and retroreflectors are configured such that each optical detection element of the two or more optical detection elements detects retroreflected light from no more than one window of the one or more windows when the erasing device is in proximity to the writing surface.

13. The erasing device 9, wherein each retroreflective portion faces a different direction from the other retroreflective portions.

14. The erasing device of claim 9, wherein the two planar surfaces of a window are angled at approximately 90° to each other.

15. The erasing device of claim 9, wherein the at least two windows are four windows.

16. An erasing device for reducing eraser ghosting in an electronic whiteboard system comprising a writing surface and two or more optical detection elements, the erasing device comprising:
 a body;
 at least two retroreflectors configured to retroreflect light beams incident at an angle within a predetermined cone of accurate retroreflection;
 one or more windows, each window comprising a concave cavity in the body of the erasing device formed of at least two angled surfaces, at least a portion of which surfaces comprise the retroreflectors;
 an orientation identification system wherein the retroreflectors are configured such that the respective cones of accurate reflection of any two retroreflectors do not overlap at a location on the writing surface when the erasing device is in proximity to the writing surface.

17. The erasing device of claim 16, wherein a first window of the one or more windows comprises a cover configured to at least partially block a first wavelength of light but permit a second wavelength of light, and the retroreflector associated with the first window is configured to retroreflect the second wavelength of light.

18. The erasing device of claim 17, wherein the first wavelength of light is with a range of visible light and the second wavelength of light is within a range of infrared light.

19. The erasing device of claim 16, wherein the retroreflectors associated with each respective window of the one or more windows face a different direction from retroreflectors associated with other windows of the one or more windows.

20. The erasing device of claim 19, wherein the one or more windows are at least four windows.

* * * * *